(12) United States Patent
Webber, Jr.

(10) Patent No.: US 7,287,751 B2
(45) Date of Patent: Oct. 30, 2007

(54) BARRIER GAME DISPLAY UNIT EDUCATION SYSTEM

(75) Inventor: M. Thomas Webber, Jr., Greenville, SC (US)

(73) Assignee: Super Duper Publications, Greenville, SC (US)

( * ) Notice: Subject to any disclaimer, the term of this patent is extended or adjusted under 35 U.S.C. 154(b) by 0 days.

(21) Appl. No.: 11/100,990

(22) Filed: Apr. 7, 2005

(65) Prior Publication Data

US 2006/0226603 A1  Oct. 12, 2006

(51) Int. Cl.
*A63F 3/00* (2006.01)
(52) U.S. Cl. .................................. 273/239; 273/287
(58) Field of Classification Search ............... 273/239, 273/265, 287; 434/365
See application file for complete search history.

(56) References Cited

U.S. PATENT DOCUMENTS

| | | | |
|---|---|---|---|
| 760,935 A | 5/1904 | Strauss | |
| 2,485,517 A * | 10/1949 | Vaule et al. ................. | 248/464 |
| 2,669,350 A | 2/1954 | Railton | |
| 2,971,277 A * | 2/1961 | Vaillancourt ................. | 434/417 |
| 2,975,539 A * | 3/1961 | Anderson ..................... | 40/600 |
| 2,975,905 A | 3/1961 | Foland | |
| 3,083,020 A | 3/1963 | Terschak | |
| 3,599,925 A | 8/1971 | Dubler | |
| 3,692,273 A | 9/1972 | Woolman | |
| 3,755,938 A | 9/1973 | Bytwork | |
| 3,769,720 A * | 11/1973 | Terrones ...................... | 434/127 |
| 4,041,630 A * | 8/1977 | Holbrook ..................... | 40/765 |
| D260,909 S | 9/1981 | Richards | |
| 4,838,793 A * | 6/1989 | Taylor ......................... | 434/168 |
| 5,029,797 A | 7/1991 | Levorchick et al. | |
| 5,413,305 A | 5/1995 | Leeb | |
| 5,458,242 A | 10/1995 | Baka et al. | |
| 5,784,814 A | 7/1998 | Capehart | |
| 6,012,717 A | 1/2000 | Love | |
| D444,176 S | 6/2001 | Leslie | |
| 6,466,921 B1 | 9/2002 | Maschhoff | |
| 6,568,114 B1 * | 5/2003 | Klukan ......................... | 40/733 |
| 6,651,367 B1 | 11/2003 | Barragan | |
| 6,848,604 B1 * | 2/2005 | Wright ......................... | 223/85 |
| 2003/0150828 A1 | 8/2003 | Bennett et al. | |

* cited by examiner

*Primary Examiner*—Vishu K. Mendiratta
(74) *Attorney, Agent, or Firm*—McNair Law Firm, P.A.; Seann P. Lahey

(57) ABSTRACT

The invention is directed to an educational system for use in instruction of educational concepts while playing a game. The system consists of a game sheet having an illustration for use in instruction of an educational concept, a set of magnetic playing pieces associated with the game sheet, and a display unit for receiving the game sheet and the magnetic playing pieces. The display unit has first and second display sides, each of which have a magnetized panel for attracting magnetic playing pieces. Further, a frame member adjacent the panel covers at least a portion of the panel, and has a game sheet receiving slot in the frame member is used for inserting and removing the game sheet.

2 Claims, 6 Drawing Sheets

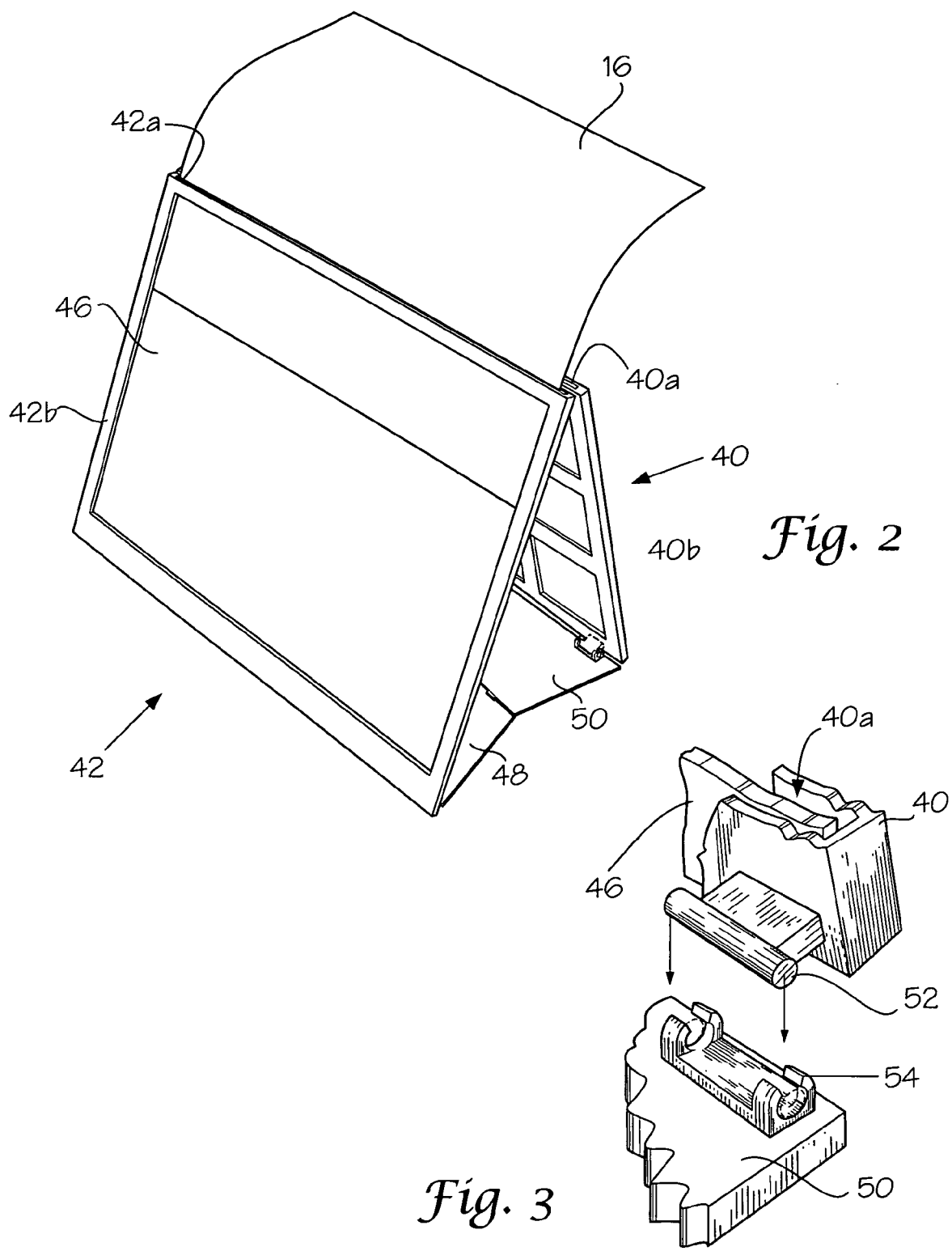

BARRIER GAME DISPLAY UNIT EDUCATION SYSTEM

FIELD OF THE INVENTION

This invention is directed to a barrier game display unit for use in an educational setting, specifically towards an educational method and system using the barrier game unit.

BACKGROUND OF THE INVENTION

A common barrier game is the Battleship game. Barrier games are played between two individuals. In an educational setting, the individuals may be two students, a student and a teacher, or other individuals. A display board is placed between the two individuals blocking the individuals from each other's view. The board further provides a display surface for playing the game. Barrier game display units are needed in order to play a variety of barrier games. In the educational field, teachers have not been provided with educational barrier game display boards. Rather, they must develop their own boards which are usually crude and rudimentary, at best. The boards do not allow for interchangeable game sheets. Furthers, these boards are not collapsible and are difficult to transport. Furthers, these boards cannot receive magnetic playing pieces.

SUMMARY OF THE INVENTION

The invention is directed to an educational system for use in instruction of educational concepts while playing a game. The system consists of a game sheet having an illustration for use in instruction of an educational concept, a set of magnetic playing pieces associated with the game sheet, and a display unit for receiving the game sheet and the magnetic playing pieces. The display unit has first and second display sides, each of which have a magnetized panel for attracting magnetic playing pieces. Further, a frame member adjacent the panel covers at least a portion of the panel, and has a game sheet receiving slot in the frame member is used for inserting and removing the game sheet.

The second display side is hingedly attached to the first display side. The display unit further includes a first base panel hingedly attached to the first display side and a second base panel that is hingedly attached to the first base panel and the second display panel. Thus, a collapsible display unit is provided so that the barrier game display unit may be collapsed and transported. The first side of the magnetized display panel may be a whiteboard panel for attracting magnets and for providing a surface that can be written on and erased. The game sheet receiving slot can be located on the top of the frame member.

A barrier game display unit is used in teaching while using magnetic playing pieces and associated game sheets. The display unit has a first display side which includes a magnetized panel for attracting magnetic playing pieces and a frame member covering at least a portion of the magnetized panel of the first display side. The frame includes a game sheet receiving slot. The unit also has a second display side hingedly attached to the first display panel. The second display panel includes a magnetized panel for attracting a magnetic playing piece and a frame member covering at least a portion of the magnetized panel of the second display side. The frame member includes a game sheet receiving slot.

The invention further comprises a method of teaching students using a barrier game display unit, a set of magnetic playing pieces and associated game sheets. The method comprises the steps of providing a game sheet and a set of associated magnetic playing pieces, providing a barrier unit having opposing side panels wherein the panels provide a play display surface for attracting magnetic playing pieces and the panels have openings for receiving the associated game sheet. The game sheet is then inserted in each side panel of the barrier unit. The teacher then elicits a response from the student that requires placement of a magnetic playing piece on the game sheet carried by the board.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 2 is a perspective view further illustrating the barrier game display unit and a game sheet.

FIG. 3 is a cutaway exploded perspective view of a portion of FIG. 4.

DESCRIPTION OF A PREFERRED EMBODIMENT

Referring now in more detail to the drawings, the invention will now be described in more detail.

Figure 6:
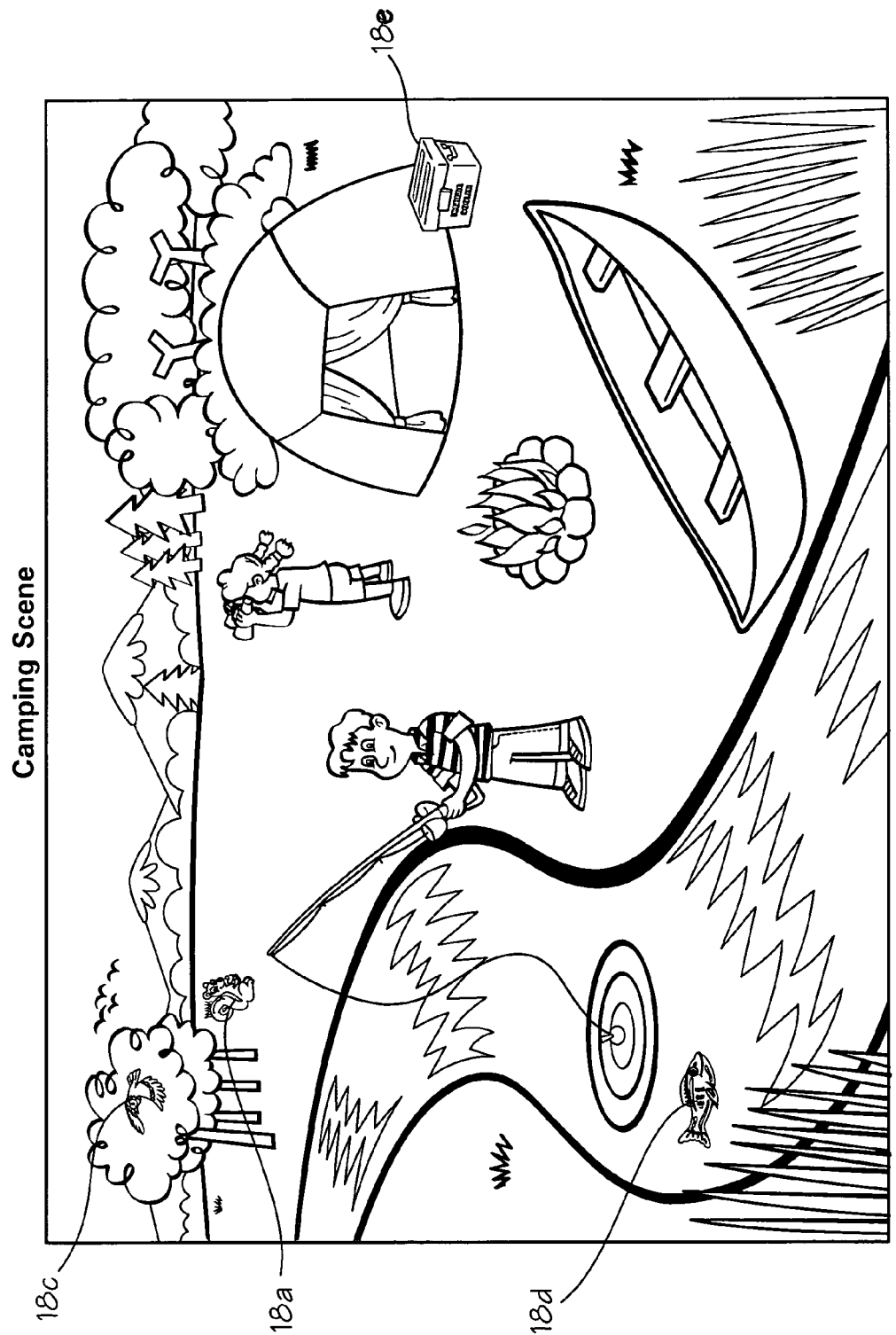
FIG. 6 is an illustration of a game sheet for use in the invention.
Figure 7:
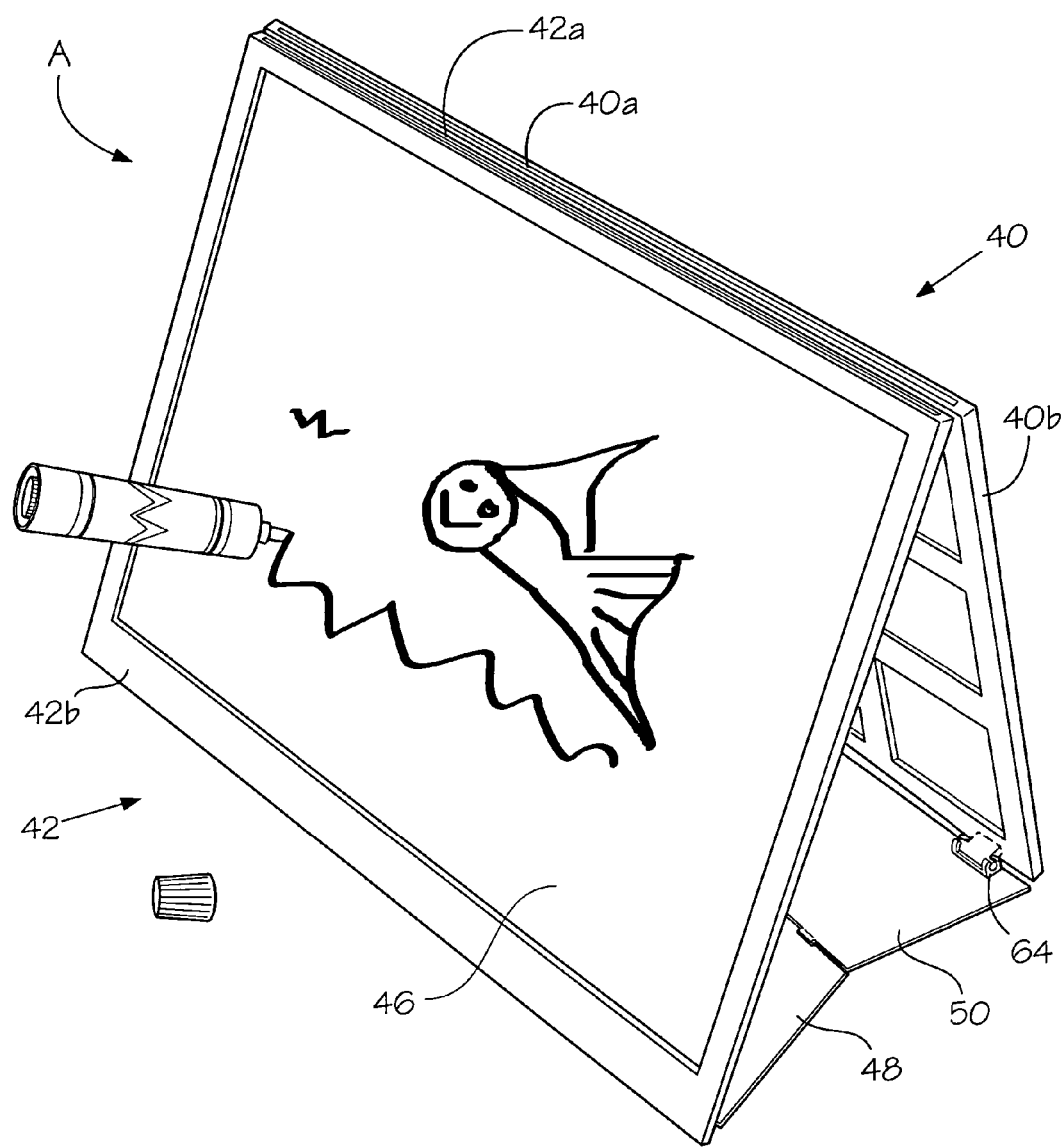
FIG. 7 is a perspective view illustrating an embodiment of the barrier game display unit.

An educational system for use in the instructional concepts while playing a game is shown in FIGS. 1-7. As can best be seen in FIG. 1, a display unit A along with a set of magnetic playing pieces 18a-d associated with game sheet 16 for use in playing a game. Game sheet 16 may contain an illustration for use in the instruction of an educational concept. FIG. 6 shows the magnetic playing pieces placed in the proper position on the display board. These magnets are retained on the game display sheet when the game display sheet is inserted into a game display unit, designated generally as A.

As can best be seen in FIGS. 2-5, a display unit A is provided for receiving game sheet 16 and at least one of the set of magnetic playing pieces 18a-d. The display unit includes first and second display sides 40 and 42. Each of these display sides include a magnetized whiteboard panel 46 for attracting a magnetic playing piece. Each display side also includes a frame member 40b and 42b adjacent the magnetized panel covering at least a portion of the magnetized panel. Further, each display side 40 and 42 includes a game sheet receiving slot 40a and 42a for inserting and removing the game display sheet. The game sheet slides into the frame of one of the display sides. The game sheet 16 is retained in position by frame 42b of side 42. Included within display side 42 is whiteboard panel 46. Whiteboard panel 46 allows for the receiving of magnets on the barrier game display board, after sheet 16 has been inserted. Further, as can best be seen in FIG. 7, dry erase board markers may be used to draw on the dry erase board material. In alternative embodiments, panel 46 may be made of any material that is conducive to receiving magnets.

Base panels 48 and 50 provide a base for the barrier game display board such that the display board may be placed on a level surface. As can best be seen in FIG. 3, side 40 attaches to base 50 via male hinge member 52 and female hinge member 54. This allows for movement when the board is collapsed. First and second display sides 40 and 42 are hingedly connected via hinge 62. The display unit also includes first base panel 48 and second base panel 50. First display panel 42 is hingedly attached to first base panel 48. Second display side 40 is hingedly attached to second base panel 50 via hinge 64. First and second base panels 48 and 50 are attached via hinge 66. Thus, the barrier game display unit is collapsible so that the unit may be collapsed and transported with ease.

Figure 4:
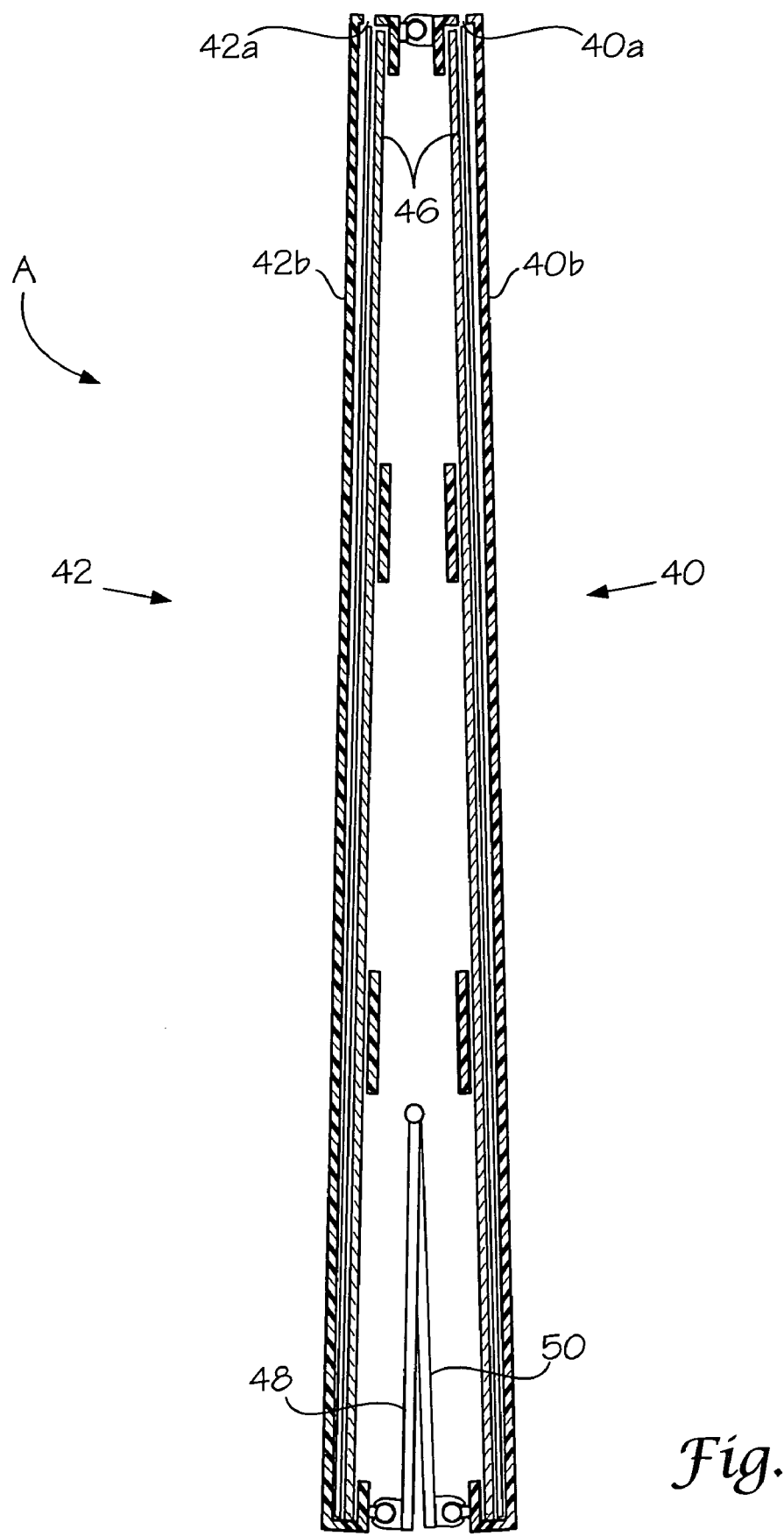
FIG. 4 is a side elevation of a cutaway of the barrier game display unit while in a collapsed position.
Figure 5:
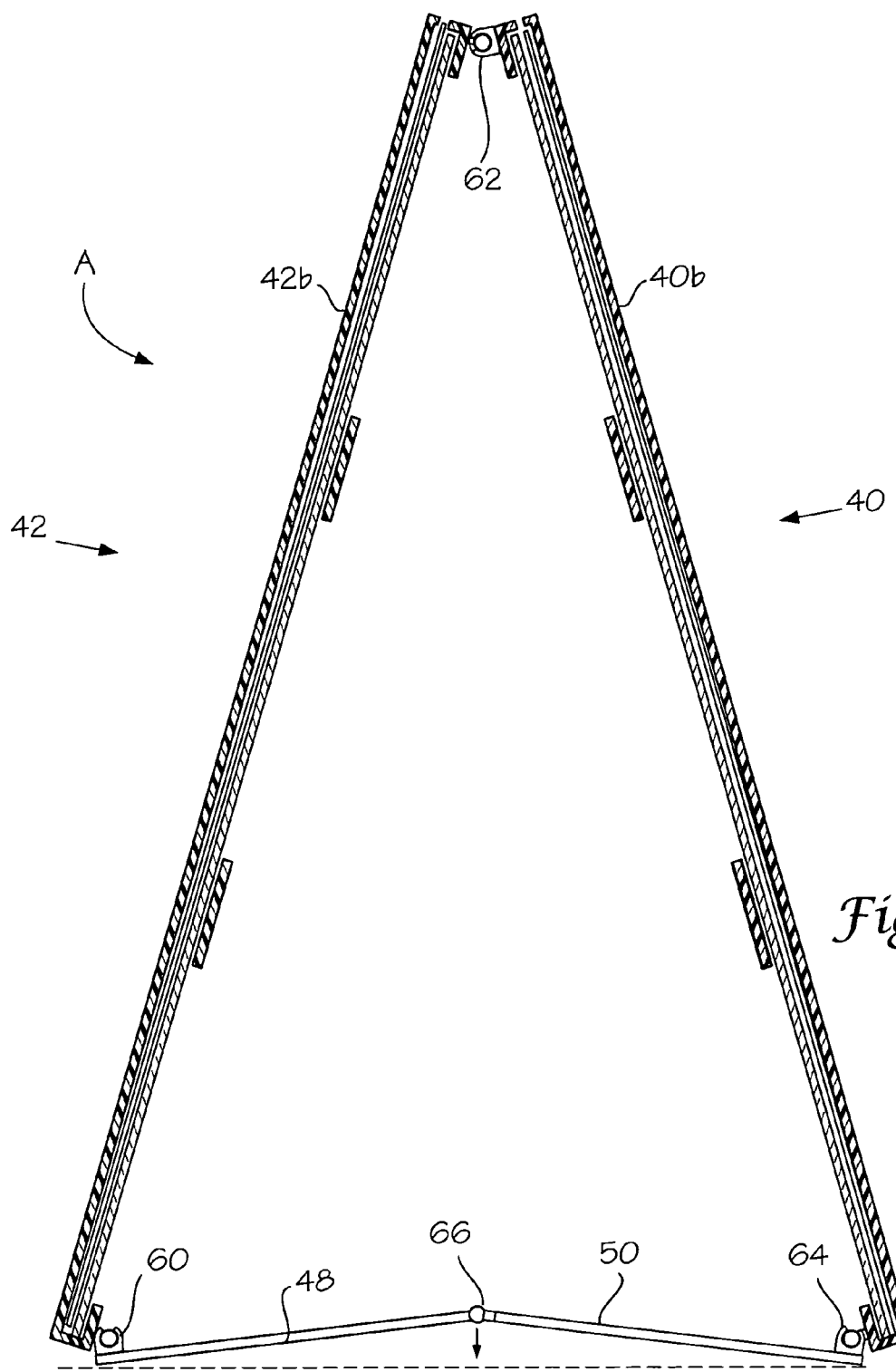
FIG. 5 is a side elevation of a cutaway of the barrier game display unit in a partially collapsed position.

FIG. 4 illustrates the board in the collapsed position. As is shown, sides 42 and 40 are brought closely while through the collapsing of base panels 48 and 50. As can best be seen in FIG. 5, the opening of the barrier game display is shown in more detail. Base panels 48 and 50 move downward, forming a base between side panels 42 and 40. These side panels are held in a stationary position once base panels 48 and 50 collapse to a level surface. The collapsing is accomplished via the hinges shown as 60, 62, 64 and 66. These hinges operate as shown in FIG. 3. In further embodiments, any type of connection that allows movement such that the board is collapsible may be used.

Game sheet receiving slot 40a may be located at the top of frame member 40b as shown in the figures. Note that in alternative embodiments, game sheet receiving slots 40a and 42a may be disposed on either side of frame members 40a and 42b or on the bottom of frame members 42b.

FIG. 6 illustrates an example of game sheet 16 and associated magnets. Game sheet 16 contains an illustration of a camping scene. Magnets 18a-e represent themes associated with camping. Magnet 18d is a fish, and thus, it has been properly placed in the river. Magnet 18c is a bird and it has been properly placed in the sky above the trees in the general direction of the view of the girl with the binoculars. Squirrel 18a is shown properly near the trees where a squirrel would traditionally be found. Cooler 18c is shown properly next to the tent where a cooler would traditionally be stored.

A variety of games may be played with this and other game sheets. Note that a variety of game sheets and associated magnets may be used with the associated barrier game display board. The camping game sheet illustrated in FIG. 6 may be used to teach a variety of concepts. For example, the teacher may instruct the students to put the fish where it belongs. A student is being tested on their concept of fish living in water. Further, the student may be asked to place the fish below the fishing line of the fishing rod. This tests the student's understanding of concepts of above and below. Note that alternative game display sheets can be used that may test and instruct a variety of concepts and that camping is used for illustrative purposes only. As discussed above, concepts of in and out may be taught or tested. Further, concepts of in front of, behind, next to, between, over, and others may be tested. Further, the student may be instructed or tested on deductive reasoning. The student may be instructed to place the magnetic playing piece representing the animal that flies in the air on the game display board. Should the student properly select the bird and place it in the air, it is clear that the student understands what a bird is and where a bird would commonly be located.

Figure 1:
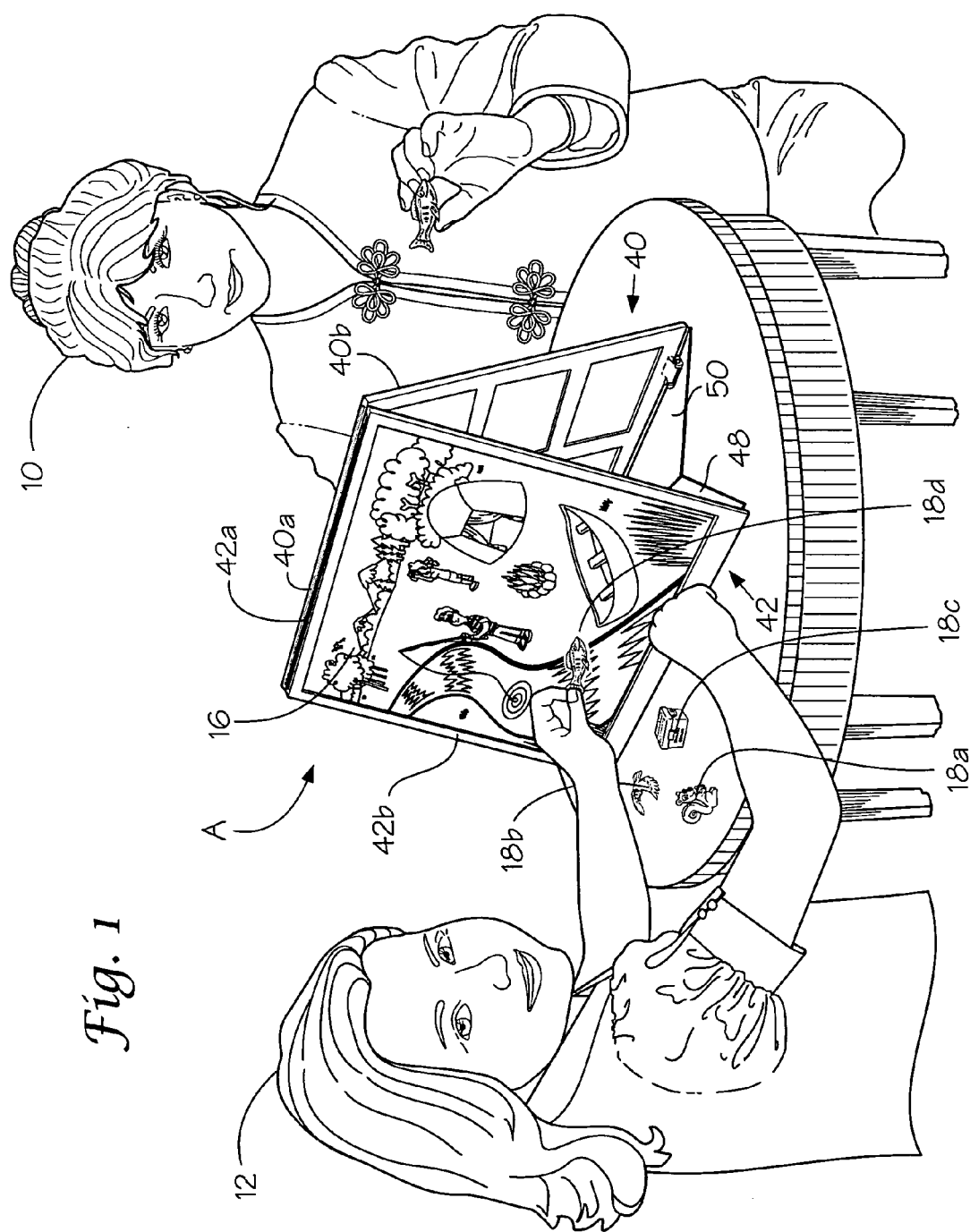
FIG. 1 is a perspective view illustrating the barrier game display unit with magnetic playing pieces and an associated game sheet in use.

FIG. 1 illustrates the educational system being used by teacher 10 and student 12. Barrier game display unit 14 is being used to play a game involving the teacher 10 and the student 12. Game display sheet 16 has been inserted into barrier game display board allowing the game to be played. The set of magnets 18A-18D are shown that are associated with the illustration. Teacher 10 has asked student 12 to place fish 18D on the proper part of the illustration. Student 12 is properly placing the magnet 18D on the display board.

The actions described above are part of a method of teaching students using a barrier display unit, magnetic playing pieces and associated game sheets. The method of teaching students using the board consists of providing a game sheet and a set of associated magnetic playing pieces to the student. The students should also be provided with a barrier game display unit having opposing side panels wherein the side panels provide a play display surface for attracting magnetic playing pieces. The opposing side panels should also have an opening for receiving the associated game sheet. The game sheet should be inserted into each side panel of the barrier board to provide a display surface for the playing pieces. A response should then be elicited from the student that requires the student to place a magnetic playing piece on the board. At this point, further responses may be elicited from the student, or the teacher can use the student's action to assist in educating the student.

While a preferred embodiment of the invention has been described using specific terms, such description is for illustrative purposes only, and it is to be understood that changes and variations may be made without departing from the spirit or scope of the following claims.

What is claimed is:

1. A barrier game display unit for instructing on educational concepts through the use of a set of magnetic playing pieces and associated game sheets comprising:

a first display side interconnected with a second display side and each having a magnetized panel for mounting the magnetic playing pieces;

a retaining frame disposed around a peripheral edge of said magnetized panel on said first and second display sides defining a retaining channel between said magnetized panel and said retaining frame for receiving and retaining the game sheets;

a game sheet receiving slot formed in said retaining frame defining an opening continuous with said retaining channel for inserting the game sheets through said retaining frame and into said retaining channel and withdrawing the game sheets from said retaining channel; and, a first mating hinge element carried on a rear of said first display side having a receiving channel, and a second mating hinge element having a projecting member complementary to said receiving channel for engaging said receiving channel being carried on a rear of said second display side cooperating with said first mating element to pivotally attach said first display side to said second display side for moving said display sides between a folded configuration for transport and an unfolded configuration for use; and, a first base panel hingedly attached directly to a rear of said first display side through interconnecting mating elements; and a second base panel hingedly attached directly to a rear of said second display side through interconnecting mating elements;

wherein said first base panel and said second base panel are of equally dimensioned and said first base panel is pivotally connected to said second base panel, and wherein said first and second base panels have an unfolded configuration separating said first and second display sides to support the unit in a triangular upright position, and a folded configuration wherein said first and second display sides are drawn together in a collapsed arrangement for transport and said first and second base panels remain interconnected and disposed between said first and second display sides.

2. The barrier game display unit of claim 1 wherein said game sheet receiving slot is located on a top side of said retaining frame.

* * * * *